(12) United States Patent
Rudravaram et al.

(10) Patent No.: US 7,616,965 B2
(45) Date of Patent: Nov. 10, 2009

(54) METHOD AND APPARATUS FOR CALCULATING A DEVICE LOCATION

(75) Inventors: Pavan K. Rudravaram, Orlando, FL (US); Keith J. Goldberg, Casselberry, FL (US); Guenael T. Strutt, Sanford, FL (US)

(73) Assignee: Motorola, Inc., Schaumburg, IL (US)

( * ) Notice: Subject to any disclaimer, the term of this patent is extended or adjusted under 35 U.S.C. 154(b) by 298 days.

(21) Appl. No.: 11/461,178

(22) Filed: Jul. 31, 2006

(65) Prior Publication Data

US 2008/0026770 A1    Jan. 31, 2008

(51) Int. Cl.
*H04Q 7/20* (2006.01)
*H04B 1/69* (2006.01)

(52) U.S. Cl. .................... 455/456.1; 455/446; 375/141
(58) Field of Classification Search .................. 455/446, 455/456.1, 456.2, 456.3; 375/141
See application file for complete search history.

(56) References Cited

U.S. PATENT DOCUMENTS 6,799,047 B1    9/2004 Bahl et al.
7,203,497 B2 *  4/2007 Belcea .................. 455/446
2004/0180665 A1 * 9/2004 Slawitschka et al. ........ 455/446
2006/0194588 A1 * 8/2006 Zhao .................... 455/456.1

* cited by examiner

*Primary Examiner*—Charles N Appiah
*Assistant Examiner*—Kiet Doan
(74) *Attorney, Agent, or Firm*—Randi L. Karpinia (57) ABSTRACT

A method and apparatus for calculating a location of a device is provided. A likelihood of the device being located at a particular location point or a particular location floor is determined using a likelihood calculation at each of a plurality of locations. The location point or location floor is then identified as that location having an associated highest likelihood calculation. The likelihood calculation includes calculating a distance from the device to each of a plurality of reference routers including one or more virtual coplanar reference routers, wherein each of the one or more virtual coplanar reference routers comprise a projection of a non-coplanar reference router onto the floor.

12 Claims, 6 Drawing Sheets

FIG. 9

METHOD AND APPARATUS FOR CALCULATING A DEVICE LOCATION

FIELD OF THE INVENTION

The present invention relates generally to a system and method for accurately identifying the location of a wireless device. More particularly, the present invention relates to the employment of such a system and method in a practical application, such as a fire and rescue scenario, to quickly and accurately identify the floor number where a device (and its associated user) is located.

BACKGROUND

Wireless communication networks, such as mobile wireless telephone networks, have become increasingly prevalent over the past decade. These wireless communications networks are commonly referred to as "cellular networks", because the network infrastructure is arranged to divide the service area into a plurality of regions called "cells". A terrestrial cellular network includes a plurality of interconnected base stations, or base nodes, that are distributed geographically at designated locations throughout the service area. Each base node includes one or more transceivers that are capable of transmitting and receiving electromagnetic signals, such as radio frequency (RF) communications signals, to and from mobile user nodes, such as wireless telephones, located within the coverage area. The communications signals include, for example, voice data that has been modulated according to a desired modulation technique and transmitted as data packets. As can be appreciated by one skilled in the art, network nodes transmit and receive data packet communications in a multiplexed format, such as time-division multiple access (TDMA) format, code-division multiple access (CDMA) format, or frequency-division multiple access (FDMA) format, which enables a single transceiver at the base node to communicate simultaneously with several mobile nodes in its coverage area.

In recent years, a type of mobile communications network known as an "ad-hoc multi-hopping" network has been developed. In this type of network, each mobile node is capable of operating as a router for the other mobile nodes providing most of the functionality of a base station, thus expanding the coverage area with very little cost.

More sophisticated ad-hoc networks are also being developed which, in addition to enabling mobile nodes to communicate with each other as in a conventional ad-hoc network, further enable the mobile nodes to access a fixed network and thus communicate with other fixed or mobile nodes, such as those on the public switched telephone network (PSTN), and on other networks such as the Internet.

Either in conventional wireless communications networks, or in ad-hoc wireless communications networks, it may be necessary or desirable for a mobile node to be capable of knowing or determining a relative or absolute geographic location or position. As known to those skilled in the art, this can be achieved through the use of a number of technologies. These technologies require cell identification, combined with Round Trip Time (RTT), Timing Advance (TA) and Measured Signal level (RX level), Time Difference of Arrival (TDOA) and Angle Of Arrival (AOA) techniques, the details of which can be appreciated by one skilled in the art. Another available technology uses cellular signal timing based methods for code division multiple access (CDMA) and wideband code division multiple access (WCDMA). Yet another technology uses Global Positioning System (GPS) techniques, which is generally viewed as being more accurate than all other methods listed.

Despite the fact that the GPS technique has been in use for a considerable period of time and most of the world's navigation relies on it, the GPS technique is very susceptible to large errors in measurement in some specific conditions. It can provide location determination results with very high accuracy only after performing a relatively large number of measurements involving a large number of satellites to remove propagation and method errors. It will be appreciated by those of ordinary skill in the art that the GPS technique is unsuitable for those terrestrial-based networks operating in an environment where the number of visible satellites is too small for providing good precision as in underground tunnels, inside buildings, under heavy foliage or in urban "canyons".

Existing methods and systems generally relate to mobile networks that connect to a permanent fixed network where location information is presented as absolute locations. However, as can be appreciated by those of ordinary skill in the art, temporary ad-hoc multi-hopping networks do not necessarily have the same requirements. Therefore, a need exists for a portable, easily deployed, self-contained ad-hoc multi-hopping network system where location detection is desired, such as where the location of personnel operating in emergency condition is critical. The location may be provided in addition to, or in replacement of absolute geo-location, and should be readily communicable between and among various transmission obstacles typically present in such location.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method steps and apparatus components related to calculating a device location. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

It will be appreciated that embodiments of the invention described herein may be comprised of one or more conventional processors and unique stored program instructions that control the one or more processors to implement, in conjunction with certain non-processor circuits, some, most, or all of the functions of calculating a device location described herein. The non-processor circuits may include, but are not limited to, a radio receiver, a radio transmitter, signal drivers, clock circuits, power source circuits, and user input devices. As such, these functions may be interpreted as steps of a method to perform device location calculations. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The present invention provides for the calculation of the two-dimensional location of a mobile node in a building based on lateral distances calculated from the TOA (Time Of Arrival) measurements, using at least three reference devices. Reference devices are placed on various floors of a building but only the coplanar references that record the distance measurements to the mobile node can be used for calculation purposes.

As will be appreciated by those of ordinary skill in the art, the location of personnel operating in emergency conditions is very important for many reasons. There have been cases when personnel, such as firefighters, are lost in smoke and become confused about the real position of themselves or others on the present or previous floors on which they were operating. The system and method described below is presented as one embodiment, which is configured for assuring the safety of firefighters. In yet another embodiment of the present invention, the system and method can be configured for supporting the activity of any number of other emergency or Special Forces deployments.

The incident and personnel management system according to an embodiment of the present invention described herein is designed to provide the means to track emergency personnel within an incident area, such as a burning building. Personnel location is reported by building floor and/or sector area. This system also provides access to real-time personnel location information and alert status indicators. Ancillary personnel data managed by the system includes attributes including unit number, name, assignment, and radio frequency.

Figure 1:
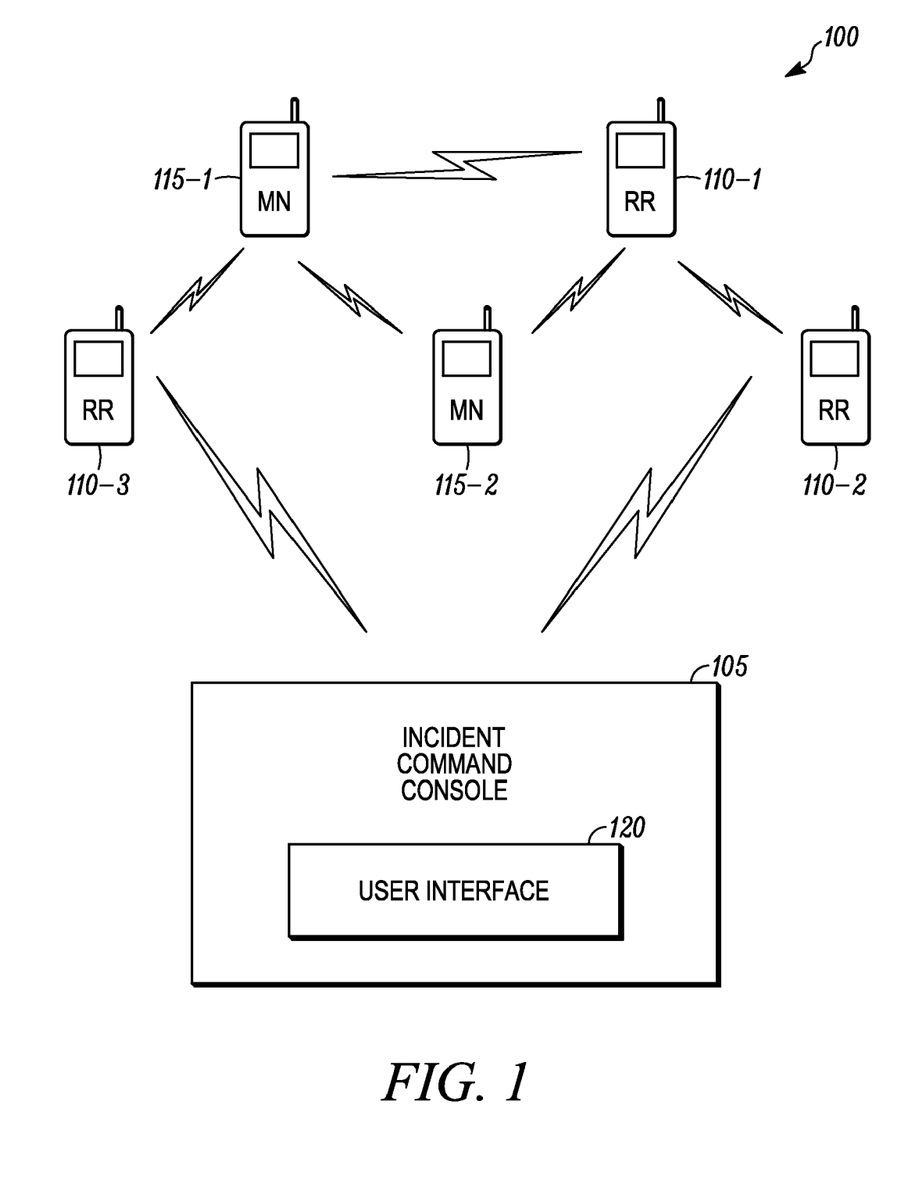
FIG. 1 is a block diagram illustrating an exemplary system 100 for incorporation of the present invention.

FIG. 1 is a block diagram illustrating an exemplary system 100 for incorporation of the present invention. The system 100, preferably employs the use of an ad-hoc, wireless, multi-hopping communications fabric capable of carrying voice, video and data, and further capable of calculating the relative position of certain elements that reside within the network boundary. The ad-hoc nature of such a system is one of several attributes that make the system 100 simple to deploy and capable of yielding complete connectivity between all network nodes to insure timely delivery of critical information to an Incident Command Console (ICC) 105, even when subjected to harsh or constantly changing physical conditions.

As described in more detail below, the system 100 further comprises, among other things, the Incident Command Console (ICC) 105, a plurality of reference routers 110-$n$, and at least one mobile node 115-$n$. The Incident Command Console 105, for example, can comprise a personal computer including a user interface 120. An incident management application is executed on this personal computer and is communicatively coupled to the network fabric via a wireless network card. The incident command console 105 is preferably entirely self-contained and intended to be monitored by personnel managing the incident scene, such as the leader of the Rapid Intervention Crew (RIC). The incident management application is intended to provide a graphical representation of real-time personnel location and identification information. Specifically, the data reported by the Incident Command Console 105 can include the location of all personnel within the incident area; unit number, name, assignment of radio frequency; nearest reference router (typically an ingress/egress point) and range to each individual; ability to represent personnel by squad (via Captain/Squad Leader) or as individuals; alarm status of each individual as well as loss of network communication with an individual or loss of communication with a reference router.

A reference router 110-$n$ is a small portable device that employs the use of a wireless transceiver card for communicating with the remainder of the system 100. These devices are deployed as static reference points around the incident area. These devices are typically deployed by on-site personnel, such as an RIC, after they have arrived at the incident scene. Reference routers 110-$n$ are typically deployed in columns within stairwells and close to elevator shafts, that is, at ingress and egress points. Multiple reference router columns can be deployed as required to increase the radio coverage area and the reliability of the system.

A mobile node 115-$n$, for example a MeshTrack device manufactured by Motorola Inc., is similar in form factor to the reference router 110-$n$, except it is intended to be employed as a mobile device, that is, a mobile terminal, carried by on-scene personnel for position tracking and accountability. The mobile node 115-$n$ preferably includes location technology to calculate a relative position within the incident scene, which is accomplished by wireless interaction with reference routers 110-$n$ that have been deployed within the incident area as described in detail below. The mobile nodes 115-$n$ make use of the deployed reference routers 110-$n$ and other mobile nodes 115-$n$ as an ad-hoc wireless communications fabric to relay vital information to the incident command console 105.

As discussed above, the fundamental technology that serves as the backbone and data delivery mechanism in this system is an ad-hoc multihopping networking solution that allows deployments to be performed rapidly, without critical dependencies, using simple deployment guidelines. The network is deployed using one of two methods, namely, the network infrastructure components (reference routers 110-$n$) could be pre-deployed, as part of a building management and safety system (e.g., coupled to the "Exit" signs on each floor), or could be deployed as an incident occurs. Regardless of when the network is deployed, the deployment guidelines are the same, as will now be discussed.

First, a command post is established, which is the location where the command post is deployed and the incident is managed via the Incident Command Console (ICC) 105. This location should allow wireless connectivity to at least two reference routers within the incident area. Connectivity between the incident command console 105 and the reference router network can be attained at ranges of several hundred to several thousand feet.

Reference routers 110-$n$ are deployed in columns outside of ingress and egress points (typically near or inside stairwells and/or elevator shafts). Reference routers 110-$n$ are placed on and around those floors and areas in which assets will be tracked, which are typically fire floors and staging areas. Each reference router 110-$n$ is logically tied to a floor and column. The location information (i.e. the floor and column information) for each reference router 110-$n$ can be pre-loaded into the incident command console 105 or configured real-time via a graphical user interface by the Incident Commander. Although the system can provide location information when only one reference router column is deployed, deploying a larger number of reference router columns improves the location accuracy, increases the supervised area and assures redundancy needed in case any of the devices are lost due to heat or falling debris. The size of the coverage area and the accuracy of located position are strongly affected by the partitioning methods and materials used on each floor. After the network of reference routers 110-$n$ is deployed, location updates from personnel employing the use of a mobile node 115-$n$ within the incident area are automatically reported to the Incident Command Console 105.

Figure 2:
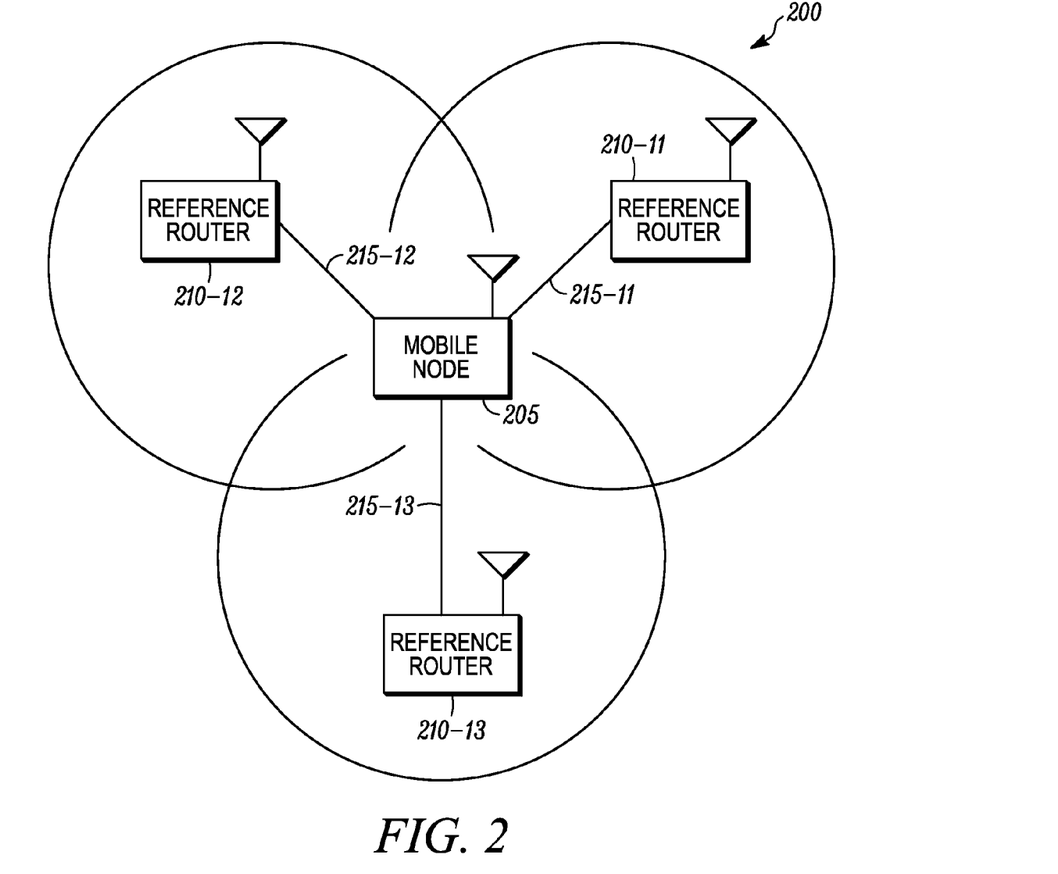
FIG. 2 illustrates an exemplary calculation of a two-dimensional location within a system such as the exemplary system of FIG. 1.

FIG. 2 illustrates an exemplary calculation of a two-dimensional location within a system 200 (such as the exemplary system 100 of FIG. 1). Specifically, FIG. 2 illustrates how the position of a mobile node 205 is calculated based on distance measurements (215-11, 215-12, 215-13) between the mobile node 205 and reference routers (210-11, 210-12, 210-13). The position of the mobile node 205 is determined by minimizing a cost function which is based on the distance measurements 215-11, 215-12, 215-13 and the known coordinates of the reference routers 210-11, 210-12, 210-13.

The calculation of the two-dimensional location of a mobile node 205 in a building is based on lateral distances calculated from the TOA (Time Of Arrival) measurements, using at least three reference devices. Reference devices 210-$xy$ (where x=floor number, y=reference number) are placed on various floors of a building but only the coplanar references that record the distance measurements to the mobile node 205 can be used for calculation purposes. Distances 215-$xy$ (where x=floor number, y=reference number) are the distances calculated based on TOA measurements from the mobile node 205 to the coplanar reference router devices 210-$xy$. For example, as illustrated, the distance 215-11 is the distance from the reference router 210-11 to the mobile node 205, the distance 215-12 is the distance from the reference router 210-12 to the mobile node 205, and the distance 215-13 is the distance from the reference router 210-13 to the mobile node 205. The point of intersection of the three reference routers' distance circles is the position of the mobile node 205.

Leveraging the measurements from non-coplanar references in a deployment allows us to calculate the mobile node's position in scenarios where there are not enough coplanar reference routers to do so. In scenarios where measurements from coplanar references are inaccurate due to loss of device, heavy multi-path, loss of signal or misplacement of the device, measurements from non-coplanar references will lead to better results. Also, the reference routers on different floors can also be used to accurately determine the floor of the mobile node.

Figure 3:
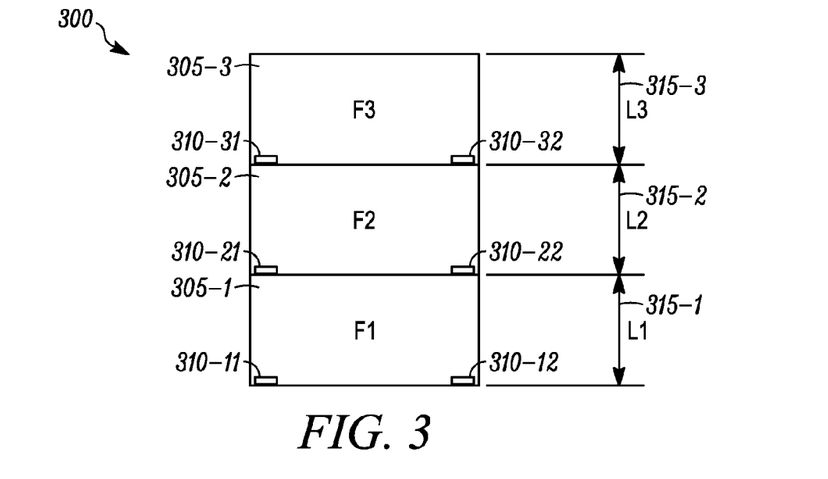
FIG. 3 is a conceptual block diagram illustrating an exemplary building for implementation of some embodiments of the present invention.

FIG. 3 is a conceptual block diagram illustrating an exemplary building 300 for implementation of some embodiments of the present invention. Specifically, FIG. 3 illustrates a deployment scenario for reference routers in accordance with the present invention. As illustrated, the building 300 includes three floors (F1 305-1, F2 305-2, F3 305-3) into which six reference routers 310-$xy$ (where x=floor number, y=reference number) have been deployed in the manner described above. Besides providing the location references, the reference routers 310-$xy$ assure the network connectivity across floors and between floors. If the Incident Commander (not shown) is located too far from the incident area, supplemental wireless routers (not shown) can be deployed for connecting all wireless components in one network. Because they provide dual functionality, reference routers 310-$xy$ are often referred to as Wireless Routers (WR). A length between floors Lx for each set of floors is illustrated as L1 315-1, L2 315-2, and L3 315-3.

Figure 4:
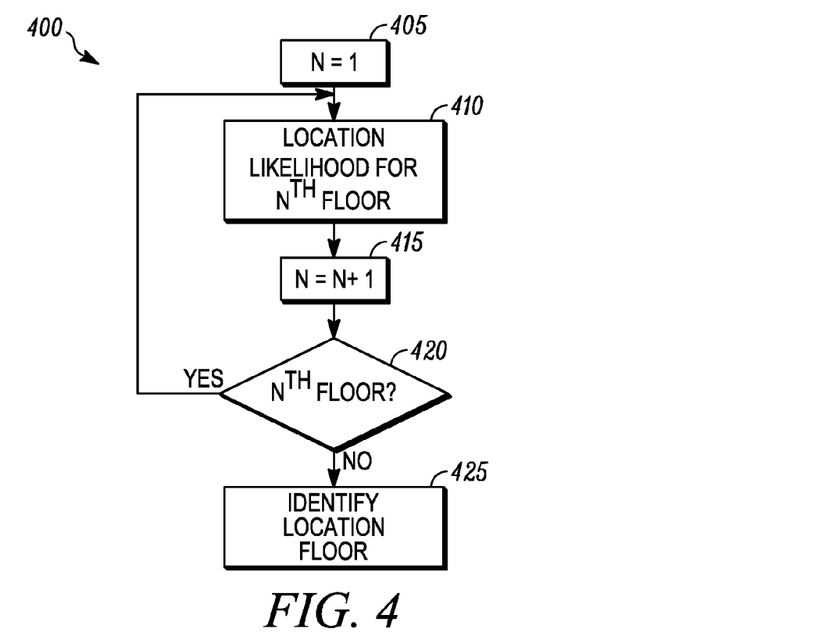
FIG. 4 is a flowchart illustrating an exemplary method of determining a location of a device within a building such as the building of FIG. 3 in accordance with some embodiments of the present invention.

FIG. 4 is a flowchart illustrating an exemplary method 400 of determining a location of a device within a building such as the building 300 of FIG. 3. As illustrated, the operation begins with Step 405 wherein a factor N is set to N=1 (one). Next, in Step 410, a likelihood calculation is used to determine a likelihood of the device to be located on the Nth floor. (i.e. one of the floors 305-$n$ of the building 300 of FIG. 3) In one embodiment of the present invention, the likelihood calculation comprises taking one or more three dimensional measurements and projecting the three dimensional measurement onto a two dimensional plane. In another embodiment of the present invention, the likelihood calculation comprises the relative distance to devices located on separate floors, based on the estimation of the distance between floors (i.e. 315-$n$ of the building 300 of FIG. 3). Next, in Step 415, the factor N is incremented to N=N+1. Next, in Step 420 it is determined whether the building includes an Nth floor. When there is an Nth floor, the operation cycles back to Step 410 and a likelihood calculation is used to determine a likelihood of the device to be located on the Nth floor. When, in Step 420, it is determined that the building does not include an Nth floor, the operation continues to Step 425 in which the floor with the highest likelihood calculation is identified. In accordance with the present invention, this is the most likely floor location for the device.

Figure 5:
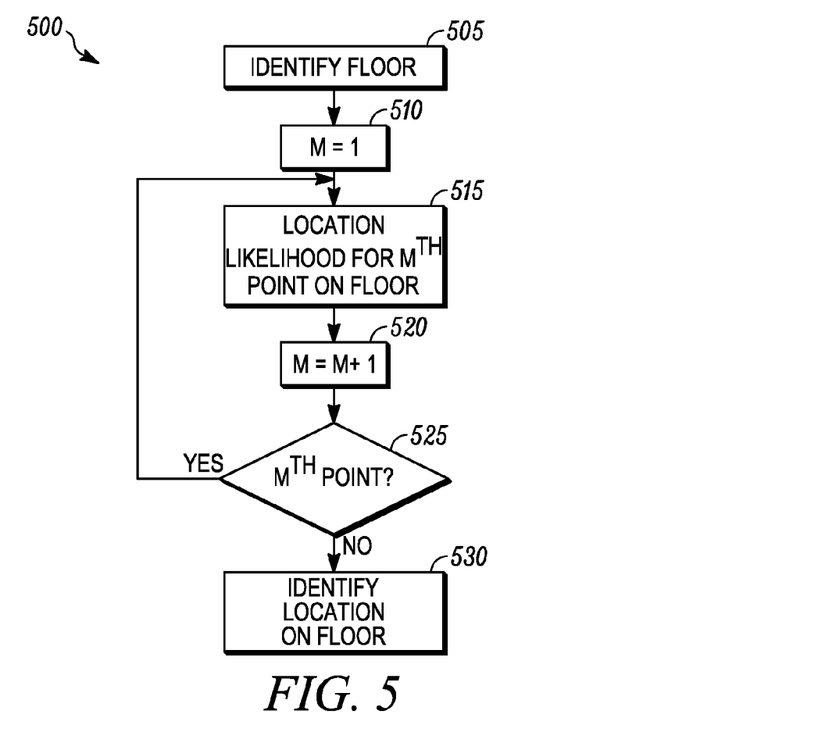
FIG. 5 is a flowchart illustrating an exemplary method of determining a location of a device within a particular floor of a building such as the floors of the building of FIG. 3 in accordance with some embodiments of the present invention.

FIG. 5 is a flowchart illustrating an exemplary method 500 of determining a location of a device within a particular floor of a building such as the floors 305-n of the building 300 of FIG. 3. As illustrated, the operation begins with Step 505 in which a floor is identified. For example, the operation 400 of FIG. 4 can be used to identify the floor. Alternatively, any other process, both manual and automatic, can be used to identify the floor. Next, in Step 510 a factor M is set to M=1 (one). Next, in Step 515, a likelihood calculation is used to determine a likelihood of the device to be located at a Mth location on the identified floor using a likelihood calculation. In one embodiment of the present invention, the likelihood calculation comprises taking three or more three dimensional measurements and projecting the three dimensional measurement onto a two dimensional plane. Next, in Step 520, the factor M is incremented to M=M+1. Next, in Step 525 it is determined whether the identified floor requires an Mth location point. When there is a need for an Mth point on the identified floor, the operation cycles back to Step 515 and a likelihood calculation is used to determine a likelihood of the device to be located at the Mth location point on the floor. When, in Step 525, it is determined that the floor does not require an Mth location point, the operation continues to Step 530 in which the location on the floor with the highest likelihood calculation is identified. In accordance with the present invention, this is the most likely location of the device on the floor.

Figure 6:
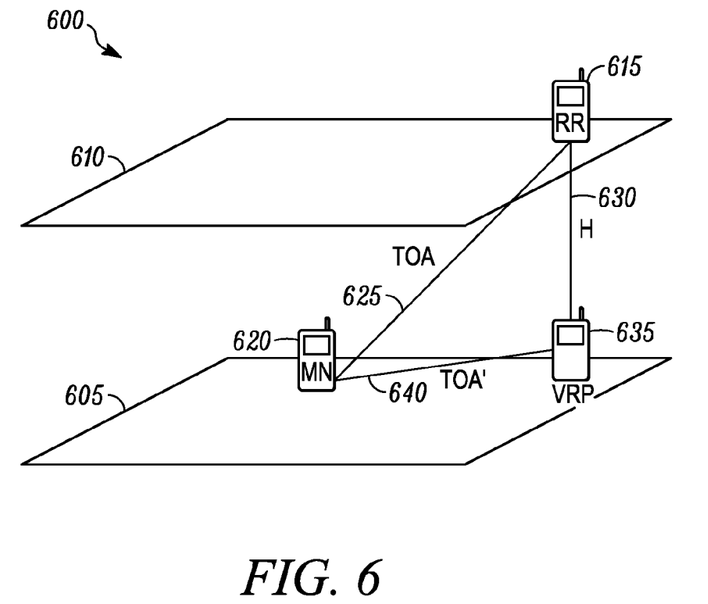
FIGS. 6 and 7 illustrate exemplary implementations within a building of the method of calculating a device location of FIGS. 4 and 5 in accordance with some embodiments of the present invention.

FIG. 6 illustrates an exemplary implementation within a building 600 of the method of calculating a device location as described previously herein. The building 600, as illustrated, includes a first floor 605 and a second floor 610. A reference router 615 is on the second floor 610 and a mobile node 620 is located on the first floor 605. The distance between the mobile node 620 and the reference router 615 cannot be used as a two-dimensional measurement of the position of the mobile node 620 since the reference router 615 is on a different horizontal plane (i.e. a different floor).

In FIG. 6, the time of arrival (TOA) 625 (proportional to the distance between the mobile node 620 and the reference router 615) and a distance between the two planar references (H) 630 are used to project the reference router 615 to a virtual reference point 635 and compute a virtual time of arrival (TOA') 640, the distance between the mobile node 620 and the virtual reference point 635.

For example the virtual time of arrival can be calculated as:

$$TOA' = \sqrt{TOA^2 - H^2}$$

The virtual time of arrival (TOA') 640 is used for the calculation of the position of the mobile node 620 on its own reference plane.

Figure 7:
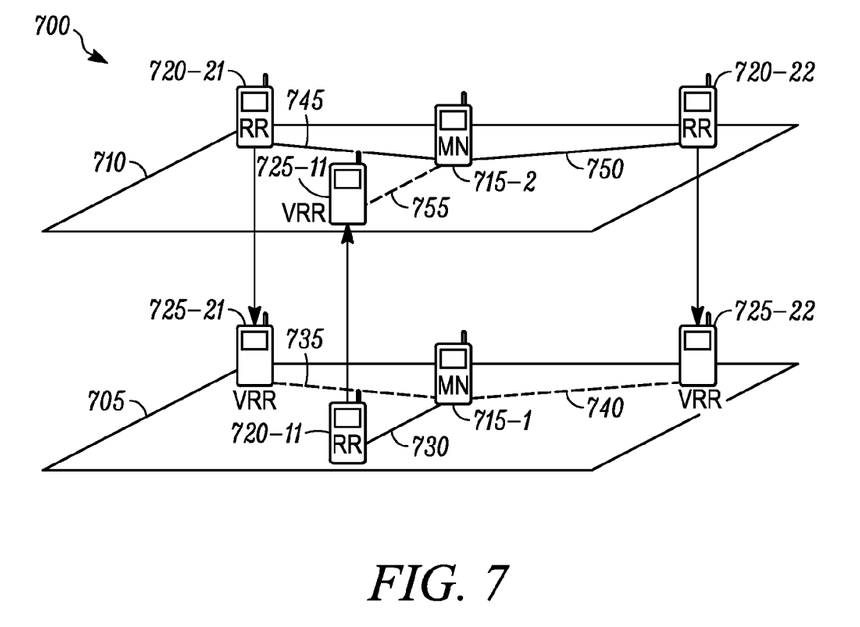

FIG. 7 illustrates an exemplary implementation within a building 700 of the method of calculating a device location as described previously herein. Specifically, FIG. 7 illustrates how non-coplanar routers are projected as coplanar routers for the purpose of calculating the location of a mobile devices on a specific floor. As illustrated, the building 700 includes a first floor 705 and a second floor 710. A mobile node 715-1 and a coplanar reference router 720-11 are located on the first floor 705. A mobile node 715-2 and two coplanar reference routers 720-21 and 720-22 are located on the second floor 710.

To determine the location of the mobile node 715-1, each of the reference routers 720-21 and 720-22 are projected from the second floor 710 to the first floor 705 as the virtual coplanar reference routers 725-21 and 725-22 respectively as described previously in associated with FIG. 6. The location of the mobile node 715-1 is then calculated using the TOA 730 between the mobile node 715-1 and the coplanar reference router 720-11, the TOA 735 between the mobile node 715-1 and the virtual coplanar reference router 725-21, and the TOA 740 between the mobile node 715-1 and the virtual coplanar reference router 725-22.

Similarly, to determine the location of the mobile node 715-2, the reference router 720-11 is projected from the first floor 705 to the second floor 710 as a virtual coplanar reference router 725-11 as described previously in associated with FIG. 6. The location of the mobile node 715-2 is then calculated using the TOA 745 between the mobile node 715-2 and the coplanar reference router 720-21, the TOA 750 between the mobile node 715-2 and the coplanar reference router 720-22, and the TOA 755 between the mobile node 715-2 and the virtual coplanar reference router 725-11.

More specific explanation of the calculations used in FIGS. 6 and 7 follows:

Knowing the following variables:

i Index of routers
$r_i$ Router i
j Floor number (or index)
Floor($r_i$) Router i's floor number
H(Floor($r_i$),j) Distance between floor j and floor of $r_i$
TOA($r_i$) Time-Of-Arrival to router $r_i$ We can calculate the coplanar distances to each router $r_i$ $$d(r_i, j) = \sqrt{TOA(r_i)^2 - H(\text{Floor}(r_i), j)^2}$$

The coplanar distance $d(r_i, j)$ can be used to calculate the position of a node on a particular floor by making efficient use of all router positions in the building. To do this, it is necessary to estimate the accuracy of the location measurement on each floor under consideration.

Typically, location determination is performed using a fitness function which identifies the likelihood of a data point being the actual position of the mobile node. To do so, it is customary to compare the estimated distance $d_{POS}(r_i, j)$ to a router $r_i$ for each floor j with the measured distance TOA($r_i$) using the TOA. The error function can be written as:

$$\varepsilon(j) = \sum_{i=1}^{N} (TOA(r_i) - d_{POS}(r_i, j))^2$$

which is the sum of the square of the estimation error. Another function (other than the sum of the squares) can also be used.

If using a non coplanar reference router, one can calculate the error using the projected distance $d(r_i, j)$ instead of the TOA:

$$\varepsilon(j) = \sum_{i=1}^{N} (d(r_i, j) - d_{POS}(r_i, j))^2$$

Figure 8:
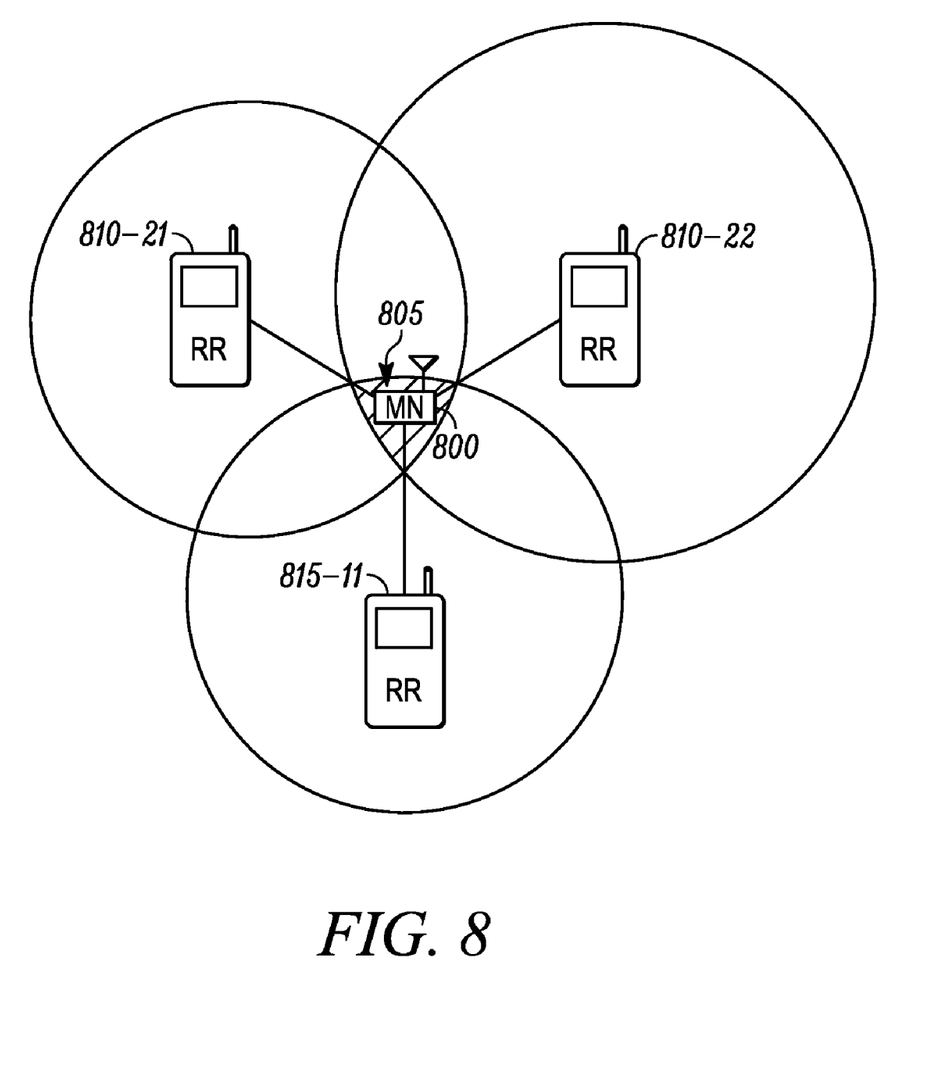
FIGS. 8 and 9 illustrate exemplary projections of the likelihood of the mobile node being located on a particular floor of a building in accordance with some embodiments of the present invention.
Figure 9:
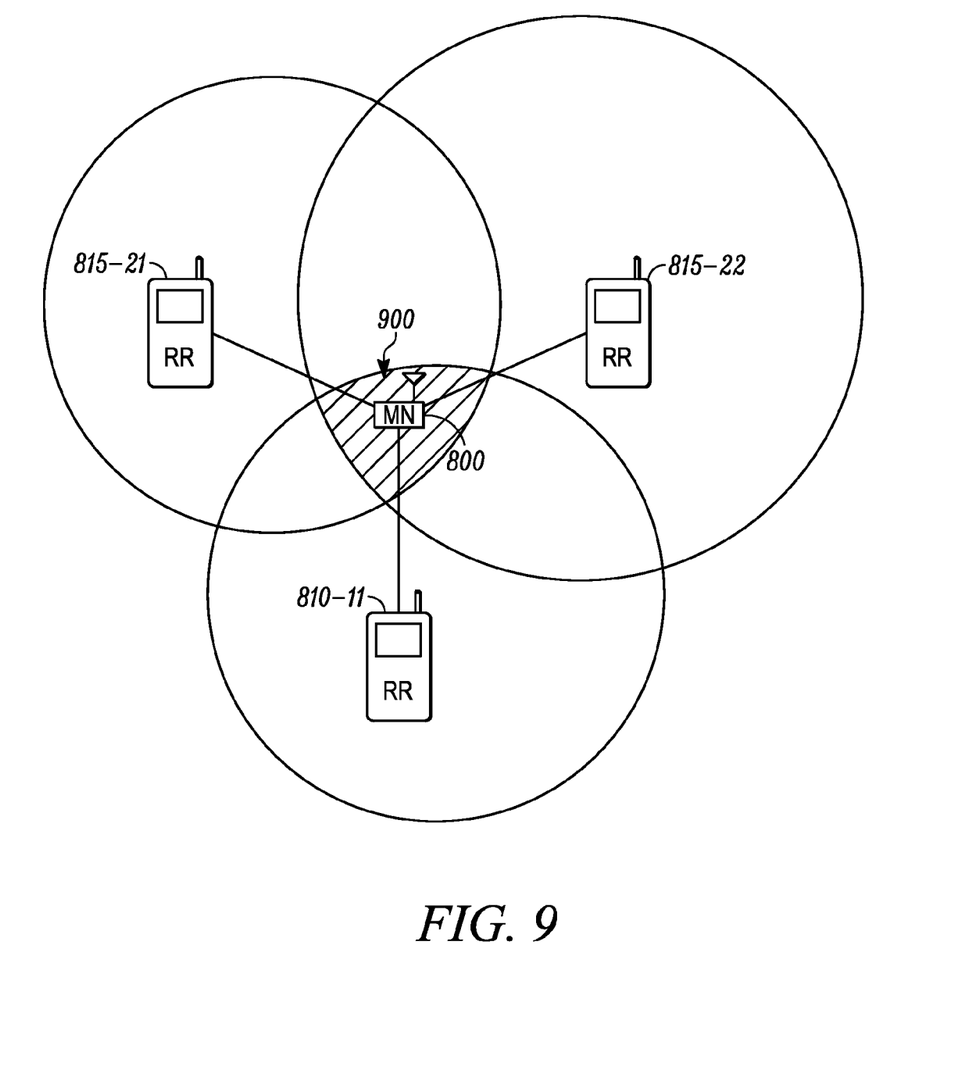

As illustrated in FIGS. 8 and 9 hereafter, the error $\varepsilon(j)$ will be much larger on each floor j that the mobile node is not actually on. The minimum error $\varepsilon(j)$ will identify the floor j where the mobile node is.

The position of a mobile node can be calculated more accurately by using additional data from virtual coplanar references. In addition, even if there are errors in measurements from the coplanar references, measurements from the virtual coplanar references will minimize the errors in the calculation of the mobile node's position. It also allows for simple floor determination, even if there are no reference routers on a particular floor.

FIGS. 8 and 9 illustrate two different projections of the likelihood of the mobile node 800 being located on a particular floor of a building. Specifically, FIG. 8 illustrates a likelihood 805 that the mobile node 800 is located on the second floor of the building using reference router projections from the first floor of the building. FIG. 9 illustrates a likelihood 900 that the mobile node 800 is located on the first floor of the building using reference router projections from the second floor of the building.

Referring to FIG. 8, as described previously herein, two coplanar routers 810-21 and 810-22 and one non-coplanar router in the form of the virtual coplanar router 815-11 are used for the purpose of calculating the location of the mobile node 800.

Referring to FIG. 9, one coplanar router 810-11 and two non-coplanar routers in the form of the virtual coplanar routers 815-21 and 815-22 respectively are used for the purpose of calculating the location of the mobile node 800. As seen by the size of the central intersecting area, the likelihood 805 of the mobile node 800 being on the first floor is higher than the likelihood 900 on the second floor (the larger the likelihood area, the larger the uncertainty). Without the use of non-coplanar reference points, the floor on which mobile node 800 is located, as well as its position would have been impossible to calculate using conventional two-dimensional methods.

The method described in this document requires much less computation than a three-dimensional location algorithm, and doesn't require the storage or estimation of a node's altitude in addition to its latitudinal and longitudinal coordinates.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

We claim:

1. A method for determining a location floor of a device within a building, the method comprising:
    determining a likelihood of the device being located on each of a plurality of floors of the building using a likelihood calculation; and
    identifying the location floor of the plurality of floors as a floor having an associated highest likelihood calculation,
    wherein the likelihood calculation for a floor includes calculating a distance from the device to each of a plurality of reference routers including one or more virtual coplanar reference routers, wherein each of the one or more virtual coplanar reference routers comprise a projection of a location of a non-coplanar reference router located on another floor to a virtual reference point within the floor, and wherein calculating the distance to each of the one or more virtual coplanar reference routers comprises calculating a virtual time of arrival between the device and the virtual coplanar reference router by:
    calculating a time of arrival between the device and the non-coplanar reference router
    determining a distance between the other floor and the floor, and using the time of arrival and the distance, and
    calculating the virtual time of arrival using the time of arrival and the distance, wherein the projection of the non-coplanar reference router comprises projecting a three dimensional measurement onto a two dimensional plane.

2. A method for determining a location of a device within a building as claimed in claim 1, wherein the projection of the location of the non-coplanar reference router includes calculating the distance between a reference router floor in which the non-coplanar reference router is located and the floor.

3. A method for determining a location of a device within a building as claimed in claim 1, wherein calculating the distance to each of the plurality of reference routers comprises calculating a time of arrival between the device and the reference router.

4. A method for determining a location of a device within a building as claimed in claim 1, wherein the virtual time of arrival is calculated by:

$$TOA'=\sqrt{TOA^2-H^2}$$

where TOA' is the virtual time of arrival

TOA is the time of arrival, and

H is the distance between the first floor and the second floor.

5. A method for determining a location point of a device within a floor of a building, the method comprising:
    determining a likelihood of the device being located at each of a plurality of locations on the floor using a likelihood calculation; and
    identifying the location point of the plurality of locations as the location having an associated highest likelihood calculation,
    wherein the likelihood calculation for a location includes calculating a distance from the device to each of a plurality of reference routers including one or more virtual coplanar reference routers, wherein each of the one or more virtual coplanar reference routers comprise a projection of a location of a non-coplanar reference router located on an other floor to a virtual reference point within the floor, wherein calculating the distance to each of the one or more virtual coplanar reference routers comprises calculating a virtual time of arrival between the device and the virtual coplanar reference router, and further wherein calculating the virtual time of arrival comprises:
    calculating a time of arrival between the device and the non-coplanar reference router,
    determining a distance between the other floor and the floor, and using the time of arrival and the distance, and
    calculating the virtual time of arrival using the time of arrival and the distance, wherein the projection of the location of the non-coplanar reference router comprises projecting a three dimensional measurement onto a two dimensional plane.

6. A method for determining a location of a device within a floor of a building as claimed in claim 5, further comprising prior to the determining step:
    identifying the floor.

7. A method for determining a location of a device within a floor of a building as claimed in claim 6, wherein the identifying the floor step comprises:
- determining a likelihood of the device being located on each of a plurality of floors of the building using a likelihood calculation; and
- identifying a location floor of the plurality of floors as a floor having an associated highest floor likelihood calculation,
- wherein the floor likelihood calculation for a floor includes calculating a distance from the device to each of a plurality of reference routers including one or more virtual coplanar reference routers, wherein each of the one or more virtual coplanar reference routers comprise a projection of a location of a non-coplanar reference router to a virtual reference point within the floor.

8. A method for determining a location point of a device within a floor of a building as claimed in claim 5, wherein the projection of the non-coplanar reference router includes calculating the distance between a reference router floor in which the non-coplanar reference router is located and the floor.

9. A method for determining a location point of a device within a floor of a building as claimed in claim 5, wherein calculating the distance to each of the plurality of reference routers comprises calculating a time of arrival between the device and the reference router.

10. A method for determining a location point of a device within a floor of a building as claimed in claim 5, wherein the virtual time of arrival is calculated by:

$$TOA' = \sqrt{TOA^2 - H^2}$$

where TOA' is the virtual time of arrival
TOA is the time of arrival, and
H is the distance between the first floor and the second floor.

11. A system for determining a location of a mobile device within a building, the system comprising:
- a plurality of reference routers communicating within a wireless network and communicatively coupled to the mobile device; and
- an incident command console communicatively coupled to the wireless network, the incident command console including:
  - a memory for storing position information associated with each of the plurality of reference routers, and
  - a processor for calculating the location of the mobile device by:
- determining a likelihood of the device being located on each of a plurality of floors of the building using a likelihood calculation; and
- identifying the location floor of the plurality of floors as a floor having an associated highest likelihood calculation,
- wherein the likelihood calculation for a floor includes calculating a distance from the device to each of a plurality of reference routers including one or more virtual coplanar reference routers, wherein each of the one or more virtual coplanar reference routers comprise a projection of a location of a non-coplanar reference router located on an other floor to a virtual reference point within the floor, wherein calculating the distance to each of the one or more virtual coplanar reference routers comprises calculating a virtual time of arrival between the device and the virtual coplanar reference router, and further wherein calculating the virtual time of arrival comprises:
- calculating a time of arrival between the device and the non-coplanar reference router,
- determining a distance between the other floor and the floor, and using the time of arrival and the distance, and
- calculating the virtual time of arrival using the time of arrival and the distance,
- wherein the projection of the location of the non-coplanar reference router comprises projecting a three dimensional measurement onto a two dimensional plane.

12. A system for determining a location of a mobile device within a building as claimed in claim 11 wherein the wireless network comprises an ad-hoc wireless multi-hopping communications network.

* * * * *